United States Patent [19]
Weiss

[11] Patent Number: 5,501,253
[45] Date of Patent: Mar. 26, 1996

[54] APPARATUS FOR FILLING VESSELS WITH LIQUID

[75] Inventor: Wilheim N. Weiss, Lappersdorf, Germany

[73] Assignee: Krones AG Hermann Kronseder Maschinenfabrik, Neutraubling, Germany

[21] Appl. No.: 282,533

[22] Filed: Jul. 28, 1994

[30] Foreign Application Priority Data

Jul. 31, 1993 [DE] Germany ............... 93 11 427.3

[51] Int. Cl.$^6$ .................................. B65B 31/00
[52] U.S. Cl. .................. 141/40; 141/45; 141/46; 141/48; 141/49; 141/50; 141/57; 141/59; 141/198; 141/293; 141/302; 141/305; 141/4; 141/5; 141/6; 141/7
[58] Field of Search ............... 141/39, 40, 44, 141/45, 46, 47, 48, 49, 50, 54, 56, 57, 59, 198, 293, 302, 305, 307, 4, 5, 6, 7

[56] References Cited

U.S. PATENT DOCUMENTS

| | | | |
|---|---|---|---|
| 3,500,879 | 10/1966 | Meyer | 141/40 |
| 3,797,535 | 3/1974 | Kaiser | 141/198 |
| 4,679,603 | 7/1987 | Rademacher et al. | 141/39 |
| 5,320,144 | 6/1994 | Ahlers | 141/5 |

*Primary Examiner*—Henry J. Recla
*Assistant Examiner*—Timothy L. Maust
*Attorney, Agent, or Firm*—Ryan, Maki & Hohenfeldt

[57] ABSTRACT

In an apparatus for filling bottles with liquid, the liquid supply tank has several bottle filling adapters mounted to its body and providing a valve seat for liquid to flow from the tank to a bottle. The seat is proximate to a vertically movable valve body which has an integral tubular stem extending upwardly from it and a gas tube extending downwardly from it so gas can be conducted downwardly into a bottle and upwardly for being exhausted or returned to the tank. In the bore of the tubular combination gas conducting tube and valve stem there is a wire constituting a filling level probe. The tip of the wire is exposed in the gas tube to liquid in the bottle and the body of the wire is insulated and runs upwardly through the bore of the tubular stem where it is terminated in a cylindrical conductive element that enters an electrical connector. The connector provides a lead to a microprocessor based controller. The probe wire running through the bore of valve stem is well protected against damage by any fragments that may result from bottle breakage and from the possibility of being wetted since, except for the tip of the probe wire, all electrical parts are positioned above the top of the liquid storage tank so they cannot be subjected to any liquid that may leak out from the filler unit or from a filled or partially filled bottle that breaks during the filling process.

9 Claims, 2 Drawing Sheets

APPARATUS FOR FILLING VESSELS WITH LIQUID

BACKGROUND OF THE INVENTION

The invention disclosed herein pertains to apparatus for filling vessels such as bottles with liquid. Hereafter, the term "bottles" will be used as a generic designation for any kind of vessel that can be filled with the apparatus.

In preexisting counterpressure bottle filling units such as is described in the German patent DE-OS 1,943,503, the liquid, usually a carbonated beverage, is held in a tank and a gas such as pressurized carbon dioxide occupies the space above the level of the liquid in the tank. The tank is usually toroidal in configuration. A plurality of bottle filler units are mounted in a circular pattern about the tank. The mouths of bottles that are to be filled are pressed against and sealed to a liquid outlet of the filler unit. The customary gas return tube is supported above the filter unit outlet or bore on a crossbar. A fill height probe or sensor extends into the bottle mouth and an electrical lead from the probe is led out of the filler unit laterally of the crossbar. The crossbar causes a considerable impediment to the flow of liquid to the bottle, thereby extending the time for filling a bottle and limiting productivity of the filling machine.

In the existing filler units, the electrical connection to the fill height probe lies below the liquid-gas storage tank in a region where it can be exposed to detrimental liquid leakage or spillage and to the impact by fragments of broken bottles, furthermore, the bottle pressurizing gas valve and the return gas valve and liquid valve setting stem are all in the region of the crossbar and, therefore, in the region underneath the storage tank. This not only exposes the electrical component to liquid but also accounts for the valves to be troublesome to access and difficult to clean. Because of the arrangement of the components of preexisting filler units, little space is available for valves in addition to the customary carbon dioxide gas purging valves. In some filler unit applications use of additional valves could be advantageous, for example, to control the flow of sterilizing steam or nonoxidizing gas such as carbon dioxide or nitrogen into the bottles. Besides, in preexisting filler units the liquid must often follow a devious path from the supply tank to the bottle. This results in increased resistance to liquid flow and a corresponding reduction in productivity.

SUMMARY OF THE INVENTION

In bottle filling apparatus, particularly in a filler unit, according to the invention the above mentioned and other problems are solved by having the valves for feeding gas to the bottle before filling and valves for conducting gas that is displaced from the bottle by liquid during filling and importantly, furthermore, having the electrical connections and connectors to the probe in a dry region above the liquid storage tank to obviate wetting and space problems. To achieve this result, the gas infeed and return tube needs only to be extended by a small amount compared to such tubes in conventional filler units. The cost of the extension is minimal. The crossbar of the preexisting valves is eliminated as are other impediments to liquid flow. The liquid flow path is without any significant tortuous turns so liquid flows in a straight vertical line out of the bottom of the storage tanks through the bore to the bottle. Filling speed is thereby maximized.

The new filler unit is distinguished by the gas tube and liquid outlet valve being unitary. That is, the movable body that moves relative to a valve seat is formed unitarily with a gas tube that constitutes a stem or tubular extension to open and close the liquid valve. The fill-level probe or sensor is where it must be in the bottle, but the electrical connections for the probe are, in accordance with the invention, in a region above the liquid-gas storage tank safe from being wetted by liquid.

The new filler unit features affiliation or integration with a plurality of valves that provide the option of flowing steam into bottles when they are connected to the unit, preevacuating or not evacuating air from the bottles before filling, inserting carbon dioxide or alternatively another inert gas such as nitrogen into the bottles before or even after liquid filling.

How the foregoing and other features of the invention are achieved and implemented will be evident in the ensuing more detailed description of a preferred embodiment of the invention which will now be set forth in reference to the drawings.

DESCRIPTION OF A PREFERRED EMBODIMENT

Figure 1:
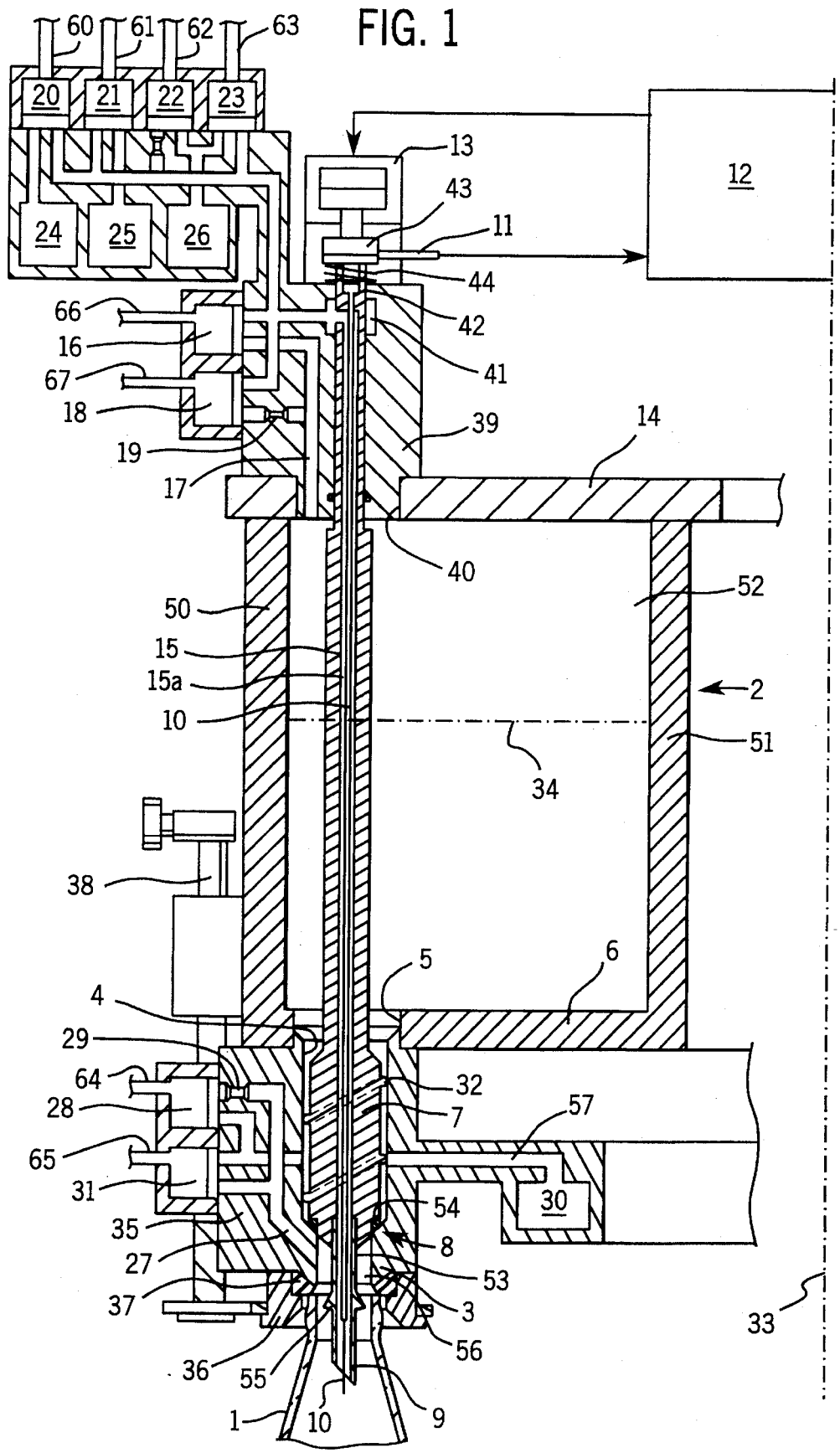
FIG. 1 is a vertical sectional view of the new filler unit mounted to a toroidal liquid-gas storage tank.

The apparatus depicted in FIG. 1 is adapted to fill bottles 1 with a beverage containing carbon dioxide, such as beer, under superatmospheric gas counterpressure conditions although the apparatus can, for example, be used to bottle wine where an inert gas such as nitrogen is used to purge air out of the bottles before they are filled.

The apparatus comprises a liquid beverage and pressure gas storage tank that is generally designated by the numeral 2. Tank 2 is toroidal in configuration. It has an exterior or radially outwardly faced wall 50 and a concentric radially inwardly faced wall 51. The top wall of the tank is marked 14 and the bottom wall is marked 6. The level of the liquid in tank 2 is indicated by the dash-dot line 34. The space 52 above the liquid is occupied by gas above atmospheric pressure. Carbon dioxide with a relatively small percentage of air mixed in it at a pressure of about two bar is typical for bottling beer. Replenishment of liquid and infeed of pressurized gas containing no air is accomplished in a conventional manner utilizing rotary distributors and radial tubes, and so forth, not shown. Toroidally shaped tank 2 rotates about a vertical axis 33.

Several valve locks 35 are mounted to the bottom 6 of tank 2. The valve locks are equiangularly spaced around the circumference of the tank. A bottle 1 filling adapter 3 is formed on the lower portion of each valve block 35.

A bottle centering bell 36 is fastened to adapter 3 and contains a pliable annular bottle mouth sealing ring 37. The bell is attached to slide member 38. The mouth of the bottle that is being filled engages the sealing ring 37 so the bottle interior has no direct uncontrolled communication with the atmosphere during filling. Slidable member 38 supports centering bell 36 and is movable vertically relative to tank 2. A bottle lifting member, not shown, is allocated to each valve block 35. The bottle lifting members revolve with the tank 2 and press the bottles 1 in gas and liquid tight sealing relation with sealing ring 37.

Filling adapter 3 extends upwardly and has a cylindrical vertical bore 4. A helical liquid flow guide surface 32 is provided on the cylindrical surface of the movable liquid valve body 7. The guide surface imparts a swirl to the liquid as it flows down bore to the bottle. The lower end 54 of valve body 7 is beveled or conical and has an annular pliable sealing ring 54 set in it. The lower end of bore 4 has a conical shape that is complementary to the conical lower end of valve body 7 and serves as a valve seat. When the valve body 7 is lifted for permitting liquid to flow into a bottle, an opening occurs between the conical end 53 of the valve body 7 and the valve seat 8 in which case liquid flows from tank 2 through opening 5 in the tank bottom 6 and then through bore 4, throat 56 and into bottle 1. Liquid flowing down into the bottle runs over a spreader 55 on gas tube 9 that deflects the liquid against the inside surface of the bottle to thereby reduce foaming which can be a problem when filling bottles with a carbonated beverage such as beer.

An obliquely directed duct 27 leads from the vertical throat 56 of filling adapter 3. The duct has an orifice or flow restricter 29 formed in it before it connects with the inlet of a snifter valve 28. Snifter valves are conventional per se and are caused to open for a moment after a bottle is filled to the proper level to relieve in a controlled manner the gas pressure existing over the top of the liquid in the neck of the bottle before the bottle is disconnected from the filler unit. When snifter valve 28 opens the gas in the bottle neck is discharged from the outlet of valve 28 to a duct 57 and to an annular chamber 30 which may be at atmospheric pressure or at a slightly negative pressure.

Another valve 31 has its inlet connected to oblique duct 27. Its outlet is connected by way of duct 57 to annular chamber 30. Valve 31 is held closed during the bottle filling process but is opened during cleaning of the apparatus for enhancing the flow of forced cleaning solutions and rinse water through the ducts, the tank and so forth.

Figure 2:
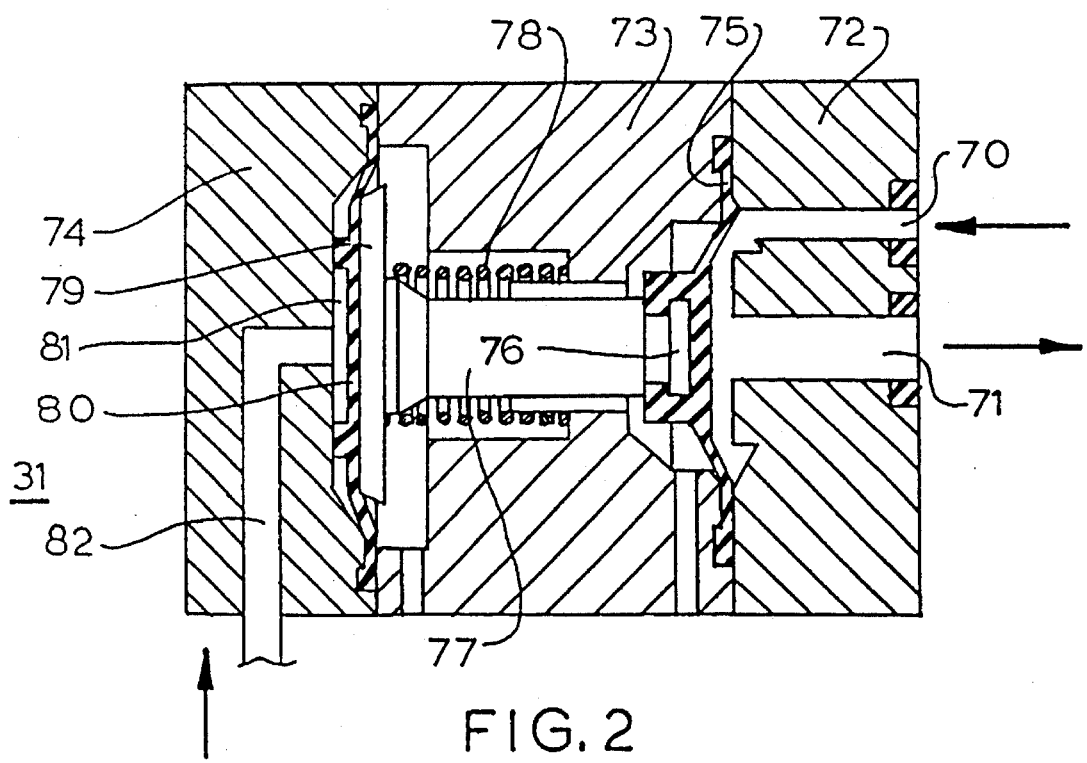
FIG. 2 is a diagram of a pneumatic diaphragm valve, several of which are used in the filler unit, the valve being shown in open fluid conducting condition.

Valves 28 and 31 as well as valves 16, 18 and 20–23 are indicated to be pneumatically operated diaphragm valves although they could be electromagnetically operated valves which are not shown. A typical diaphragm valve is shown diagrammatically in FIG. 2 where the valve is open and in FIG. 3 where the same valve is closed. Let the valve in FIGS. 2 and 3 be illustrative of the typical valve that is comparable to the valves just mentioned. The valve in FIG. 2 has an inlet duct 70 and an outlet duct 71 formed in a body part 72. The body part 72 interfaces with and is secured to a body part 73 which interfaces and is secured to another body part 74. A pliable sealing diagram 75 in FIG. 2 is presently deflected to the left so there can be free flow of gas or liquid from the inlet duct 70 to the outlet duct 71. The sealing diaphragm 75 is attached to the head 76 of a stem 77. A spring 78 in FIG. 2 reacts against the stem 77 so as to deflect diaphragm 75 to make it possible for gas to flow from inlet 70 to outlet 71. One end of stem 77 is provided with an integral disk 79 that interfaces with a pliable control diaphragm 80. Due to the force of spring 78 in FIG. 2 on stem 77, diaphragm 80 is deflected. Deflection of control diaphragm 80 is possible because no pressurized air is being applied to it by way of pneumatic control line 82. There is an air chamber 81 behind control diaphragm 80 which connects to air infeed and exhaust tube 82. In FIG. 2 no pressurized air is applied to the diaphragm to tube 82 so the valve is open.

Figure 3:
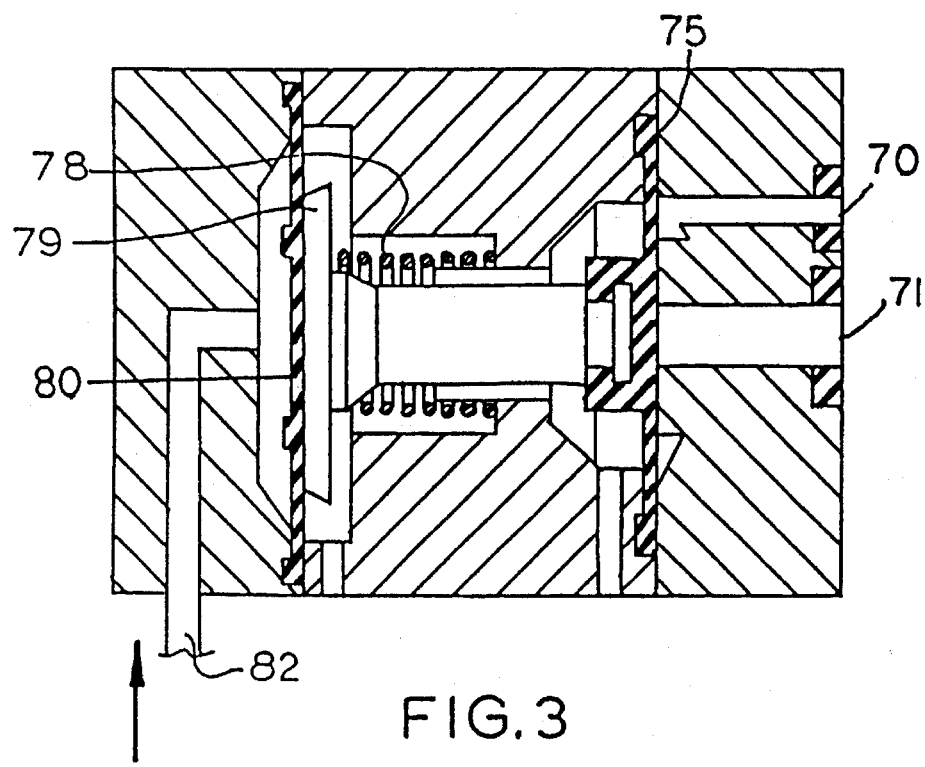
FIG. 3 is a diagram of the diaphragm valve when operated to a closed nonconducting condition.

In FIG. 3 air pressure is applied to control diaphragm 80 by way of tube 82 so diaphragm 80 straightens out thereby applying a force axially of stem 77 to compressed spring 78 and shift stem 77 to the right. The force acts on the sealing diaphragm 75 and straightens it out such that it blocks the inner ends of the ducts 70 and 71 so no fluid can flow between them.

Returning to FIG. 1, a short vertically extending gas conducting tube 9 is fastened into the conical lower end of liquid valve body 7. Tube 9 is centered in the throat 56 of filler adapter 3 so there is a channel around tube 9 to allow liquid to flow without impediment from tank 2 to bottle 1 when valve body 7 is lifted and is unseated. Tube 9 may be plastic. It has a conical liquid spreader 55 formed on it for spreading liquid toward the interior wall surface of the bottle. Short gas tube 9 extends into the neck of bottle 1 and serves the double purposes of conducting gas to and from the bottle 1 and also providing protection for the tip of a fill level probe 10 as will be discussed in greater detail later.

The upper end of valve body 7 has an integral tubular extension 15 which constitutes a valve operating stem and a gas conducting tube. Stem 15 has a gas conducting bore 15a coextensive with its length plus the length of valve body 7. Bore 15a is continuous with the bore of short tube 9. The tubular extension or stem 15 extends upwardly through the entire height of the liquid-gas tank 2 beyond the tank top 14 and into a control block 39. Stem 15, valve body 7 and tube 9 are vertically reciprocable as a unit. The reduced diameter upper end of tubular stem 15 is vertically reciprocable in gas tight sealing relation with block 39. The block is sealed in opening 40 of the tank top 14. Opening 40 is above and is coaxial and concentric with opening 5 and the tank bottom 6.

A chamber 41 is formed around tubular stem 15 in block 39. Stem 15 has a side opening in chamber 41 for the bore 15a of the stem to communicate with the outlet ducts from valves 66, 67 and valves 20–23. The latter group of four valves will be discussed briefly later. A pressurized gas duct 17 is formed in block 39 and leads to diaphragm valves 16 and 18. All of the diaphragm valves including 16 and 18 are operated as a function of time during the bottle filling process. These valves are normally open as indicated in FIG. 2 but close in response to air pressure being applied to their control tubes 66 and 67 with the same effect as applying air pressure through the control tube 82 of the illustrative valve in FIG. 3. The pneumatic controls for the valves are not shown, but in the last analysis their operation is governed by the microprocessor based controller 12.

A valve filling cycle and mode most commonly used will be discussed next. Assume that the mouth of a bottle 1 is pressed to the filler unit as in FIG. 1 to seal to sealing ring 37. The first step is to open valve 21 in the upper part of the filler unit assembly by exhausting the pressure on pneumatic control tube 61. Opening of valve 21, whose inlet connects to annular vacuum chamber 25, causes evacuation of the bottle that is to be filled by drawing air from the bottle through bore 15a of tubular stem 15 and through valve 21 to annular chamber 25. Next, as a function of time, valve 16 opens as a result of the pressure on its control tube 66 being relieved. When valve 16 opens, pressurized nonoxidizing gas such as carbon dioxide flows from the gas space 52 in tank 2 through valve 16 down bore 15a of tubular stem 15 into bottle 1. A spring 44 at the upper end of tubular extension 15 exerts a lifting force on extension stem 15 to thereby tend to open liquid valve 8. The spring does not open the liquid valve while gas is flowing into the evacuated bottle. However, when the gas pressure in the bottle 1 reaches equality with the gas pressure in tank 5, the downward force on valve body 7 from tank pressure and the upward force on the valve body 7 from the interior of the bottle balance each other and the minor force exerted by the spring 44 is sufficient to open the liquid valve 8. Liquid is now flowing into the bottle 1 and is displacing the gas from the bottle. For a major part of the liquid filling cycle, valve 16 is open to allow the displaced gas that comes up bore 15a of extension stem 15 to flow outwardly of chamber 41 in block 39 through valve 16 and return to the gas filled space 52 in tank 2. Actually, it is only during a major part of the liquid filling time that valve 16 is open whereby the highest filling rate is underway. In reality, when a certain percentage of the fill level is reached, valve 16 is closed by applying air pressure on its feed tube 66 and valve 18 is opened simultaneously by relieving pressure in its feed tube 67. Then the gas displaced from the bottle must return to tank 2 by way of the duct in which there is an orifice or restriction 19. The restricted gas flow reduces the liquid filling rate during the last part of the fill interval. This way a more precise fill height is obtainable since the probability of over travel of the liquid level is reduced.

When the liquid rises in bottle 1 sufficiently to contact liquid level sensor probe wire 10 up to a predetermined depth, the signal is transmitted to controller 12, as will be discussed later. For the present, it is sufficient to understand that when the bottle is filled to a proper level, controller 12 sends a signal that causes a pressure increase in a pneumatic cylinder 13 which drives tubular valve stem 15 and integral valve body 7 downwardly to shut off liquid flow by closing liquid valve 8. When the bottle 1 is filled with liquid to the proper level, controller 12 brings about closure of valve 18 by applying pressure to its diaphragm by way of its pneumatic control tube 67. At the same time, pressure is relieved from the control tube 64 of snifter valve 28 so it opens to relieve any gas pressure from the neck of the bottle above the liquid level before the bottle is disconnected from the filler unit. The gas relieved from the bottle is conducted through a duct which has the orifice or restriction 29 in it so that the discharge of gas is more gradual than would otherwise be the case.

Gas chamber 41 in block 39 which surrounds the tubular valve extension stem 15 communicates with bore 15a in the valve stem as indicated and also can communicate with the outlets of valves 20–23 which are diaphragm valves in this embodiment. Valves 20–23 have their inlets connected to annular chambers 24, 25 and 26 from which they can access steam, gases and vacuum. Channel 24 may contain pressurized steam which may be delivered to bottle 1 by opening valve 20 as a result of its infeed tube 60 being exhausted. Steam would flow through the self-evident path including the ducts and the bore 15a to the bottle. Usually, this would occur before evacuating the bottle. Channel 25 may be a vacuum channel that as previously indicated allows the evacuation of the bottle and drawing air through bore 15a of tubular stem 15 by opening valve 21 as a result of exhausting its infeed tube 61. Channel 26 may contain pressurized carbon dioxide or nitrogen which is admitted to the bottle by valves 22 or 23 by way of bore 15a. The outlet of valve 22 has a restriction that can be used optionally to reduce the rate at which a gas may be flowed into the bottle or valve 23 may be opened in the alternative to let gas into the bottle at a higher rate. In either case, valves 22 or 23 are opened by relieving pressure on their control tubes 62 and 63, respectively. Control valves 20–23, similarly to valves 28 and 31 are opened and closed at predetermined moments by microprocessor based electronic control device 12.

The bottle fill level sensing probe will now be discussed in reference to FIG. 1. The probe comprises a wire 10 preferably of stainless steel or other noncorrosive metal. The lower tip of wire 10 that extends into the bottle through gas tube 9 for sensing liquid level is bare and is conductive relative to liquid or other ground point. Except for the lower tip, wire 10 is insulated where it runs upwardly through bore 15a of tubular valve stem 15. Spacers, not shown, that allow gas to flow through them keep the insulated probe wire 10 fixed centrally in bore 15a so there is a sufficiently large channel around the insulation for gas conduction to and from the bottle. At its upper end, the probe wire 10 enters a cylindrical element 42 of conductive material that is covered with insulation by which the wire makes a gas tight connection, by means of a threaded plug, not shown, in the upper end of the tubular stem extension 15. After releasing said unillustrated threaded plug, the probe wire can be withdrawn from gas tube 9 and the coaxial bore 15a of tubular stem 15. The cylindrical element 42 has an uninsulated upper end, not visible, that projects into an electrical connector plug 43. A flexible lead 11 extending from the plug connects probe wire 10 with microprocessor based controller 12. It is important to observe that the electrical connections and the plug-in connectors that complete the circuit from the probe wire 11 to the controller 12 are all positioned above liquid tank 2 remotely from and above any region of the filling unit environment that could be wetted if a filled bottle breaks, a valve fails or some other leak should occur. It is notable also that the probe wire 10, particularly its insulation, is protected by virtue of passing through bore 15a of tubular valve stem 15. Pressure spring 44 was mentioned earlier as influencing the tubular valve stem extension 15 and integral liquid valve body 7 to rise for allowing liquid to flow into the bottle. Spring 44 also tends to move connector plug 43 upward with tubular stem 15. The previously mentioned pneumatic cylinder 13 that is pressurized to force the liquid valve 8 closed in opposition to the small force of spring 44 is above plug 43 and is fastened to block 39.

During the bottle filling procedure, after pretreatment of the bottle 1 with steam, vacuum or nonoxidizing gas by selective control of valves 20–23 and 16,18, the cylinder 13 is exhausted or relieved in preparation for the liquid valve 8 to be opened when the gas pressure in bottle 1 becomes equal to the pressure in tank 5 which is characteristic of counterpressure valves. When valve 8 opens, liquid flows freely from tank 2 through opening 5, bore 4 to throat 53 of adapter 3 into bottle 1. Helical guide 32 swirls the liquid and spreader 55 deflects it to the bottle wall as previously indicated. When the liquid rises along the exposed lower tip of probe 10 to a predetermined level, the signal delivered to controller 12 triggers pneumatic cylinder 13 to pressurize and the liquid valve 8 closes. Microprocessor based controller 12 has the capability of sensing the change in impedance or conductivity of the probe. The sensitivity to the change is adjustable which means that the appropriate control signal for triggering liquid valve shut off can be set to be developed when variable lengths of the probe tip are immersed. Thus, liquid fill level in the bottle can be controlled with great precision.

It is claimed:

1. Apparatus for filling bottles with liquid, comprising:

a tank (2) for storing liquid and pressurized gas, the tank including a top (14) and a bottom (6), the bottom having an opening (5), a member (35) at the bottom of the tank and having a vertical bore (4) communicating at the upper end thereof with the opening (5) in the bottom of the tank, the bore having a valve seat (8) and a liquid outflow hole (56) coaxial with the bore, a generally cylindrical valve body (7) having upper and lower ends and an axial gas conducting bore (15a), the valve body arranged for being moved downwardly in the vertical bore (4) to engage the valve seat for preventing liquid from flowing to the hole and for being moved upwardly to permit liquid to flow through the hole, a gas conducting tube (9) extending from said lower end of the valve body (7) coaxially with said axial bore (15a) for entering the mouth of the bottle, and a tubular extension stem (15) extending from said upper end of the valve body and having a gas conducting bore (15a) coaxial with the bore of the valve body, the tubular stem (15) passing through the interior of tank (2) and sealingly upwardly above the tank top (14), a body (39) mounted to said top (14) of said tank through which body said tubular extension stem extends, said body having a passageway (17) and a pneumatic control valve (16) interposed in said passageway, the control valve having an inlet for pressurized gas coupled by way of said passageway to said tank and an outlet coupled by way of said passageway and by an opening in said tubular extension stem (15) to said gas conducting bore (15a), and said tubular extension stem passing through said body (39), a pneumatic cylinder stationarily mounted proximate to said body and having a piston coupled to said tubular extension stem, and a spring exerting a force on said tubular extension stem that tends to unseat said valve body (7) from said valve seat in opposition to the force of pressure in said pneumatic cylinder, evacuation of said pneumatic cylinder allowing the spring to lift said tubular extension stem for said valve body to unseat and allow liquid to flow from said tank to a bottle, and an electrical fill level probe (10) in said gas conducting tube 9 and a signal conductor extending from within said gas conducting tube (9) throughout the coaxial bore (15a) of the tubular extension stem (15) and out of the bore (15a) above the top (14) of the tank.

2. Apparatus according to claim 1 wherein the bore of the gas conducting tube (9) has substantially the same cross sectional area as the bore of tubular extension stem (15).

3. Apparatus according to claim 1 wherein said gas conducting tube (9) is permanently connected to said lower end of valve body (7) concentrically with the bore (15a) of the valve body.

4. Apparatus according to claim 1 wherein said tubular extension stem (15) is formed integrally and as one piece with said valve body (7).

5. Apparatus for filling bottles with liquid, comprising:

a tank(2) for storing liquid and pressurized gas, the tank including a top (14) and a bottom (6), the bottom having an opening (5), a member (35) at the bottom of the tank containing a vertical bore (4) having upper and lower ends, the upper end of said bore communicating with the opening (5) in the bottom of the tank, said bore having a valve seat (8) and a liquid outflow hole (56) coaxial with the bore, a generally cylindrical valve body (7) having upper and lower ends and an axial gas conducting bore (15a), the valve body arranged for being moved downwardly in the vertical bore (4) to engage the valve seat for preventing liquid from flowing to the hole and for being moved upwardly to permit liquid to flow through the hole, a gas conducting tube (9) extending from said lower end of the valve body (7) coaxially with said axial bore (15a) for entering the mouth of the bottle, and a tubular extension stem (15) extending from said upper end of the valve body and having a gas conducting bore (15a) coaxial with the bore of the valve body, the tubular stem (15) passing through the interior of tank (2) and sealingly upwardly above the tank top (14), and an electrical fill level probe (10) in said gas conducting tube 9 and a signal conductor extending from within said gas conducting tube (9) throughout the coaxial bore (15a) of the tubular extension stem (15) and out of the bore (15a) above the top (14) of the tank, body (39) mounted to said top (14) of the tank through which body said tubular extension stem (15) extends, the body having a passageway and the tubular extension stem (15) having an opening for connecting the passageway with a continuous gas passageway comprised of the opening, the bore (15a) of the tubular extension stem and said gas conducting tube (9), and a vacuum source and a valve having an inlet connected to the vacuum source and an outlet connected to said passageway in the body for drawing air from a bottle through said gas passageway.

6. Apparatus for filling bottles with liquid, comprising:

a tank (2) for storing liquid and pressurized gas, the tank including a top (14) and a bottom (6), the bottom having an opening (5), a member (35) at the bottom of the tank containing a vertical bore (4) having upper and lower ends, the upper end of said bore communicating with the opening (5) in the bottom of the tank, said bore having a valve seat (8) and a liquid outflow hole (56) coaxial with the bore, a generally cylindrical valve body (7) having upper and lower ends and an axial gas conducting bore (15a), the valve body arranged for being moved downwardly in the vertical bore (4) to engage the valve seat for preventing liquid from flowing to the hole and for being moved upwardly to permit liquid to flow through the hole, a gas conducting tube (9) extending from said lower end of the valve body (7) coaxially with said axial bore (15a) for entering the mouth of the bottle, and a tubular extension stem (15) extending from said upper end of the valve body and having a gas conducting bore (15a) coaxial with the bore of the valve body, the tubular stem (15) passing through the interior of tank (2) and sealingly upwardly above the tank top (14), and an electrical fill level probe (10) in said gas conducting tube 9 and a signal conductor extending from within said gas conducting tube (9) throughout the coaxial bore (15a) of the tubular extension stem (15) and out of the bore (15a) above the top (14) of the tank, a body (39) mounted to said top (14) of the tank through which body said tubular extension stem (15) extends, the body having a passageway and the tubular extension stem (15) having an opening for connecting the passageway with a continuous gas passageway comprised of the opening, the bore (15a) of the tubular extension stem and said gas conducting tube (9), and a source of pressurized steam and a valve having an inlet connected to said source of steam and an outlet connected to said passageway in the body for delivering steam to a bottle when the vale is opened.

7. Apparatus for filling bottles with liquid, comprising:

a tank (2) for storing liquid and pressurized gas, the tank including a top (14) and a bottom (6), the bottom having an opening (5), a member (35) at the bottom of the tank containing a vertical bore (4) having upper and lower ends, the upper end of said bore communicating with the opening (5) in the bottom of the tank, said bore having a valve seat (8) an a liquid outflow hole (56) coaxial with the bore, a generally cylindrical valve body (7) having upper and lower ends and an axial gas conducting bore (15a), the valve body arranged for being moved downwardly in the vertical bore (4) to engage the valve seat for preventing liquid from flowing to the hole and for being moved upwardly to permit liquid to flow through the hole, a gas conducting tube (9) extending from said lower end of the valve body (7) coaxially with said axial bore (15a) for entering the mouth of the bottle, and a tubular extension stem (15) extending from said upper end of the valve body and having a gas conducting bore (15a) coaxial with the bore of the valve body, the tubular stem (15) passing through the interior of tank (2) and sealingly upwardly above the tank top (14), and an electrical fill level probe (10) in said gas conducting tube 9 and a signal conductor extending from within said gas conducting tube (9) throughout the coaxial bore (15a) of the tubular extension stem (15) and out of the bore (15a) above the top (14) of the tank, a body (39) mounted to said top (14) of the tank through which body said tubular extension stem having said gas conducting bore (15a) extends, a source of pressurized gas and a valve having an inlet connected to the source of gas and an outlet connected to said passageway in the body for delivering gas to a bottle when the valve is opened, a first valve (16) having an inlet connected to said tank in communication with the pressurized gas in the tank and an outlet connected to said passageway in the body for delivering gas from said tank to a bottle when the vale (16) is opened and for returning from said bottle to said tank the gas displaced by liquid flowing into said bottle while said valve body is moved upwardly.

8. Apparatus according to claim 7 including:

a second valve (18) having an inlet connected to said tank in communication with the pressurized gas in the tank and an orifice (17) interposed between the tank and said inlet for regulating the outflow rate of gas being displaced from the bottle by incoming liquid and thereby regulating the liquid flow rate to a bottle.

9. Apparatus for filling bottles with liquid, comprising:

a tank (2) for storing liquid and pressurized gas, the tank including a top (14) and a bottom (6), the bottom having an opening (5), a member (35) at the bottom of the tank containing a vertical bore (4) having upper an lower ends, the upper end of said bore communicating with the opening 95) in the bottom of the tank, said bore having a valve seat (8) and a liquid outflow hole (56) coaxial with the bore, a generally cylindrical valve body (7) having upper and lower ends an dan axial gas conducting bore (15a), the valve body arranged for being moved downwardly in the vertical bore (4) to engage the valve seat for preventing liquid from flowing to the hole and for being moved upwardly to permit liquid to flow through the hole, a gas conducting tube (9) extending from said lower end of the valve body (7) coaxially with said axial bore (15a) for entering the mouth of the bottle, and a tubular extension stem (15) extending form said upper end of the valve body and having a gas conducting bore (15a) coaxial with the bore of the valve body, the tubular stem (15) passing through the interior of tank (2) and sealingly upwardly above the tank top (14), and an electrical fill level probe (10) in said gas conducting tube 9 and a signal conductor extending from within said gas conducting tube (9) throughout the coaxial bore (15a) of the tubular extension stem (15) and out of the bore (15a) above the top (14) of the tank, a body (39) mounted to said top (14) of the tank through which body said tubular extension stem having said gas conducting bore (15a) extends, the body having a passageway and the tubular extension stem (15) having an opening for connecting the passageway with a continuous gas passageway comprised of the opening, the bore (15a) of the tubular extension stem, said electrical fill level probe (10) is comprised of a wire having an insulating coating where it extends through the bore (15a) of said tubular extension stem (15) and a bare end exposed in said gas conducting tube (9) to liquid rising in a bottle, an electrical connector (43) arranged above said body (39) and said wire connected to the connector, a conductor (11) leading from the connector for conducting a signal from the probe, a spring (44) arranged for applying a force tending to move said tubular extension stem (15) and integral valve body (7) upwardly to unseat said valve body (7) from said valve seat (8) in said bore (4) of said member (35), said tubular extension stem and valve body moving upwardly to permit liquid to flow from the tank (2) to the bottle 1 when the pressure of the gas in the bottle becomes equal to the pressure of the gas in the tank, and a pneumatic cylinder adapted for being subjected to pressure for causing a force to be applied to said tubular extension stem for stopping the flow of liquid from the tank to a bottle in response to a signal produced by said probe when the level of the liquid in the bottle rises to a predetermined level point on the probe.

* * * * *